Nov. 26, 1968 — E. W. CARR ETAL — 3,412,973
FLEXIBLE DISC GATE VALVE
Filed Nov. 24, 1967 — 2 Sheets-Sheet 2
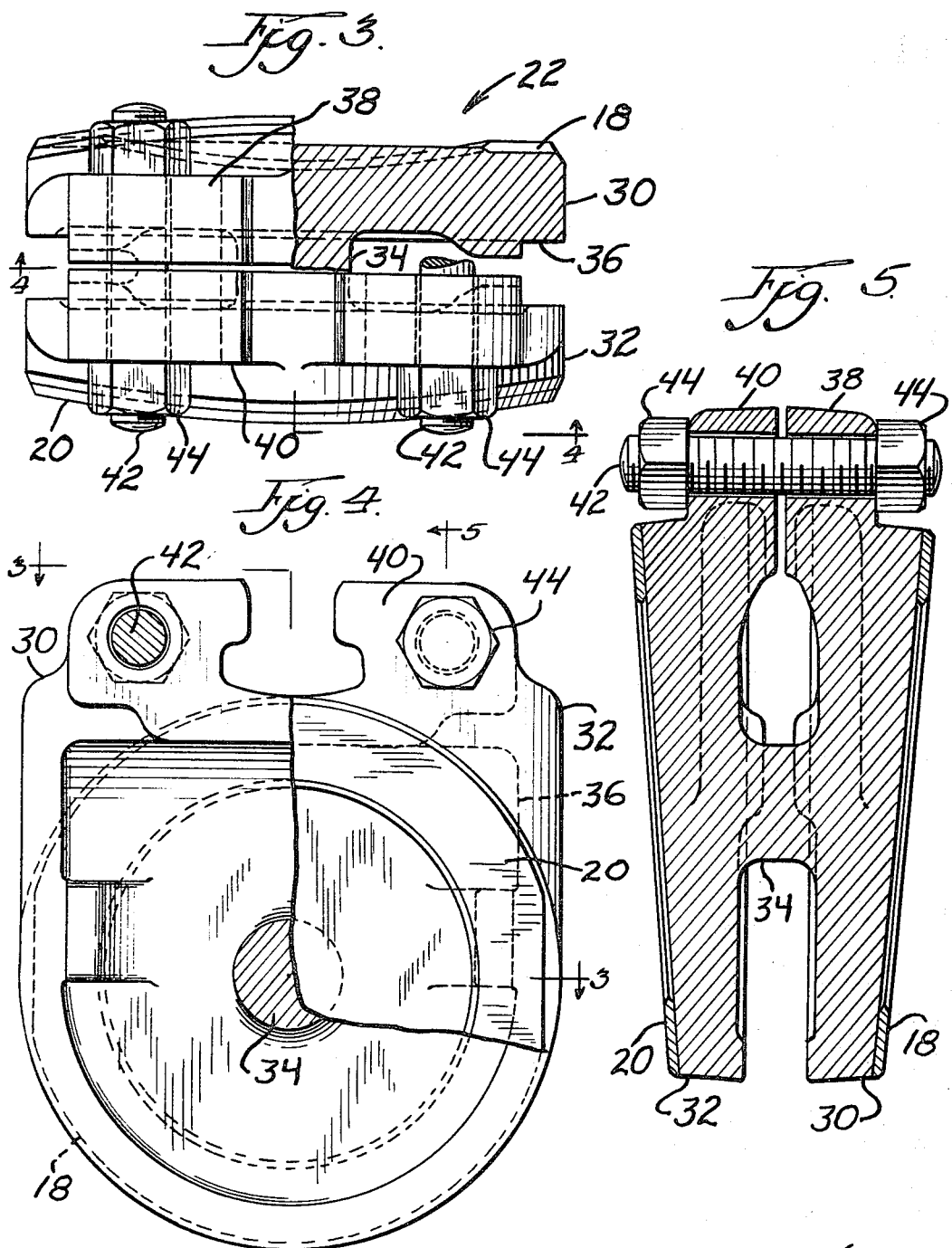
Inventors.
Edward W. Carr &
Eugene C. Petrie.
By George A. Achwind
Atty.

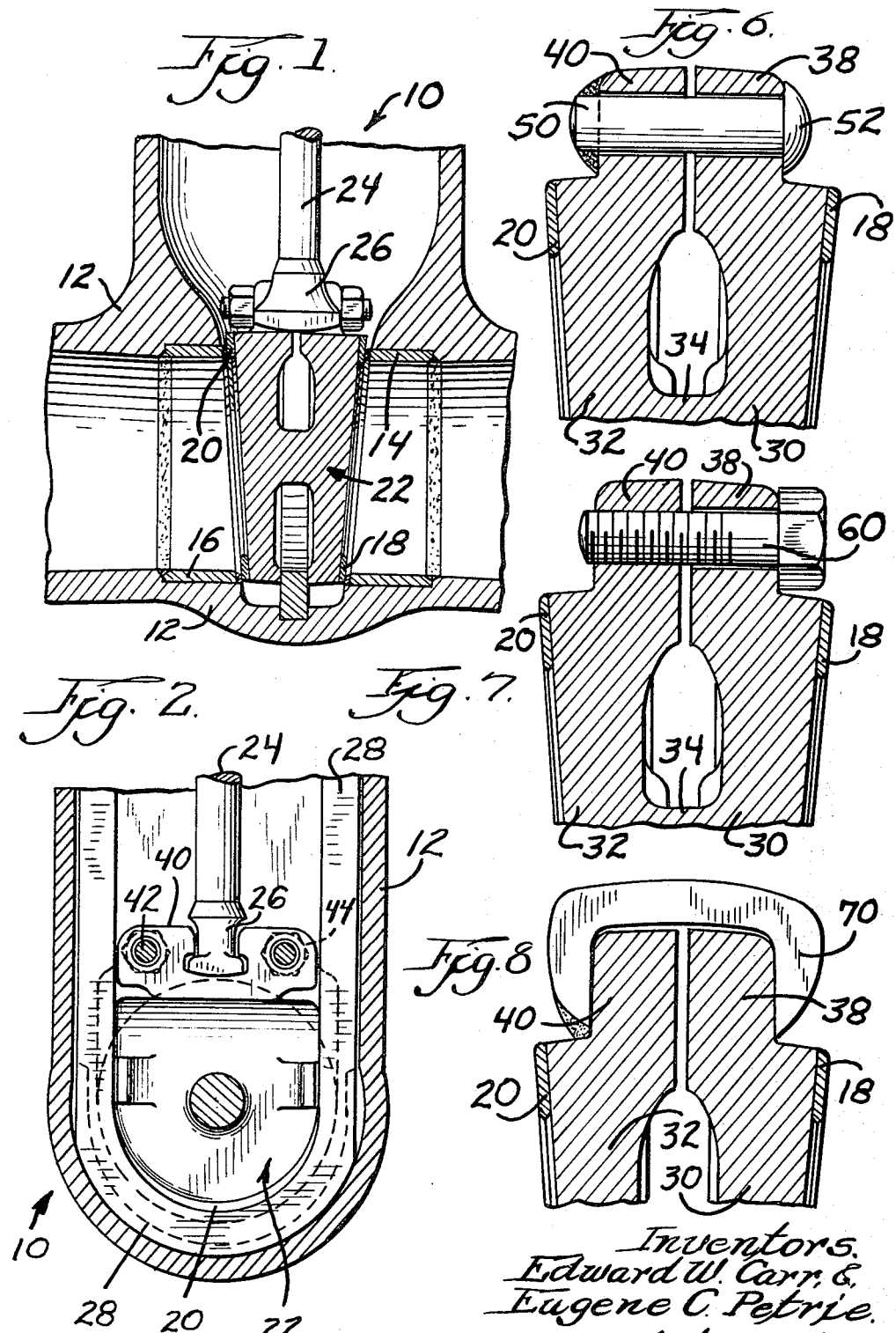

United States Patent Office 3,412,973
Patented Nov. 26, 1968

3,412,973
FLEXIBLE DISC GATE VALVE
Edward W. Carr, Cicero, and Eugene C. Petrie, Elmhurst, Ill., assignors to Crane Co., Chicago, Ill., a corporation of Illinois
Filed Nov. 24, 1967, Ser. No. 685,581
9 Claims. (Cl. 251—327)

ABSTRACT OF THE DISCLOSURE

A gate valve of the type having converging valve seats. A pair of spaced discs are centrally joined to form a flexible, wedge-shaped valve closure member. At the widest portion of the closure wedge, the discs are provided with projections adapted to engage the inverted T-head of an actuating member. Cooperatively associated with the disc projections are stop means, such as screws, bolts, rivets, C-clamps and the like, which serve to limit lateral spreading of the discs, thus preventing damage to valve seating surfaces and other elements of the valve structure which might result from expansion of entrapped fluid.

BACKGROUND—SUMMARY—PRIOR ART

The present invention relates to gate valves, and more particularly, to gate valves of the type which employ flexible, wedge-shaped valve closure members.

Gate valves having convergent valve seats have been known for a long time in the valve art. In early devices, the valve closure member was typically of a solid wedge construction wherein the opposed faces of the wedge were provided with seating surfaces for mating with the convergent valve seats. The closure member was designed and sized such that a slight wedging effect would be provided when the member was inserted between the convergent valve seats, thus insuring a fluid tight connection. However, such solid wedge closure members exhibited certain disadvantages, principally due to the fact that the solid wedge could not readily adapt itself to correct for mis-alignment between the seats and the closure member.

These disadvantages were largely overcome by the development of a flexible disc type closure member, which comprised a pair of spaced discs which were centrally joined to form a flexible wedge disc closure member. Such a flexible disc closure member is disclosed and claimed in United States Patent No. 2,569,412, issued Sept. 25, 1951, and assigned to the assignee of the present invention. The flexibility provided by the centrally joined discs forming the wedge closure member insured fluid tight sealing under conditions of mis-alignment and imprecise sizing, and permitted ready interchangeability of parts for field repairs. Moreover, the flexibility of the wedge disc closure member ensured easy valve operation by obviating objectionable sticking of the member under varying temperature conditions.

However, due to the very flexibility of the centrally joined discs, additional problems are presented. For example, upon closing of a gate valve, fluid may become entrapped in the valve bonnet. If the entrapped fluid then becomes heated, it may exert tremendous forces which tend to spread the discs apart at the widest portion of the wedge-shaped closure member.

Regardless of the type of fluid, if, due to the system peculiarities, the upstream and downstream pressures of the valve, become less than the pressure head trapped in the bonnet cavity, the internally trapped fluid exerts pressure against both seating surfaces, doubling the unseating effort required by the valve stem. Valves have been known to become inoperative due to the lack of sufficient unseating force. Of greater concern is that introduced when liquids are contained in the system. Liquids, when trapped in the body-bonnet cavity, if heated for any reason, can create tremendous pressure forces.

An object of this invention is to relieve such pressures before they become excessive and either prevent valve opening or seriously damage or destroy valve components.

Another object of the instant invention is to provide a means to limit the outward axial movement of the flexible disc wedge-shaped gate valve but also allow the member to have inner axial movement.

A further object is to provide an improved flexible disc type closure member having a safety means which is readily adaptable for use with practically any flexible disc type member.

A further object is to provide an improved safety device for a flexible disc type valve which is ready adjustable and reliable.

Numerous attempts to overcome this problem have been made, including the provision of bonnet venting means or bypass arrangements. Such attempts, however, have proved to be either too complicated and costly, or functionally unsatisfactory.

The present invention provides a simple and inexpensive means for overcoming the problem of valve damage resulting from undue lateral flexing of the closure discs. In accordance with the invention, the centrally joined discs are provided with projections, and cooperatively associated with such projections are stop means which absolutely limit the degree of lateral spreading of the discs. The stop means may take the form of rivets or bolts passing through the disc projections, C-clamps which engage each projection, or a screw which passes through one of the projections and threadably engages the other. The use of screws or bolts permits in-place adjustability of the stop means. In this manner, undue stress caused by heating of entrapped fluid is absorbed by the stop means, thus preventing physical damage to the valve structure. In addition, the stop means limits the lateral separation of the discs at the widest portion of the wedge closure member. At the same time, as the pressure increases, the body will expand and separate from the restrained disc. The resultant gap provides escape of excess pressure loads at the seating faces where the least opposition exists, generally the upstream side.

BRIEF DESCRIPTION OF DRAWINGS

The foregoing advantages, features and objects of the present invention will be more fully appreciated and understood by considering the remainder of the specification and claims, with illustrative reference to the drawings, in which:

FIGURE 1 is a sectional side view of a portion of a gate valve embodying the claimed invention;

FIGURE 2 is a sectional end view thereof;

FIGURE 3 is a top plan view of an illustrative valve closure member embodying the invention, partially sectioned on the line 3—3 of FIGURE 4;

FIGURE 4 is a side elevation of the valve closure member, partially sectioned on the line 4—4 of FIGURE 3;

FIGURE 5 is a sectional view of the valve closure member taken on the line 5—5 of FIGURE 4;

FIGURE 6 is a view similar to that of FIGURE 5, showing a modified form of the invention;

FIGURE 7 is a view similar to that of FIGURE 5, showing another modified form of the invention; and FIGURE 8 is a view similar to that of FIGURE 5, showing a third modified form of the invention.

DESCRIPTION OF PREFERRED EMBODIMENTS

With reference to FIGURES 1 and 2, there are shown pertinent portions of a typical gate valve 10 which is defined by a main body structure 12. Not shown are the conventional connecting end portions and bonnet of the gate valve 10. The body structure 12 is provided with conventional convergent body seat rings or valve seats 14 and 16 which are adapted for mating with corresponding seating surfaces 18 and 20 on the opposed faces of a wedge-shaped closure member 22. An actuator stem 24 is provided with a T-head 26 and is adapted for engagement with the valve closure member 22 to move the member vertically into and out of closing engagement with the valve seats 14 and 16. As best seen in FIGURE 2, the gate valve 10 is provided with a U-shaped disc guide member 28, which serves to guide the closure member 22 into and out of engagement with the valve seats 14 and 16.

As best seen in FIGURES 3 through 5, the valve closure member 22 comprises a pair of spaced discs 30 and 32 which are centrally joined by a core portion or shank 34. The discs 30 and 32 are respectively provided with the valve seating surfaces or rings 18 and 20. As can be seen from FIGURE 3, the discs 30 and 32 are cut away to provide a substantially peripheral groove 36 for mating with the U-shaped guide member 28. Because the discs 30 and 32 are spaced apart, and due to the relative narrowness of the connecting shank 34, the wedge closure member has sufficient flexibility to ensure fluid-tight seating under all conditions, as fully disclosed and claimed in United States Patent No. 2,569,412.

The discs 30 and 32, at the widest portion of the closure member 22, are respectively provided with projections 38 and 40. As best seen in FIGURES 1, 2 and 4, the projections 38 and 40 are cut away, or slotted, for engagement with the T-head 26 of the actuator stem 24.

FIGURE 5 best shows the cooperative association of the stop means with the projections 38 and 40. As shown therein, a bolt 42 passes through suitable apertures in the projections 38 and 40. A pair of nuts 44, which are threaded onto the bolt 42, bear against the side surfaces of the projections 38 and 40, and thus serve as an absolute limitation on lateral spreading of the discs 30 and 32. Thus, if upon closing of the gate valve 10, fluid becomes entrapped in the open space between the discs 30 and 32, undue pressure induced loads or stresses are prevented from occurring by the spreading restriction of the bolt 42 and nuts 44, permitting the body to expand away from the seating rings 18 and 20 and the valve seats 14 and 16 thereby providing a pressure relieving gap between the seats and disc. The nuts 44 can be adjusted to provide any desired limitation on the lateral spreading of the discs 30 and 32.

FIGURES 6, 7 and 8 illustrate modified forms of stop means which are suitable for use in connection with the invention. As shown in FIGURE 6, a rivet 50 having a head 52 passes through both of the projections 38 and 40. The headless end of the rivet 50 may, as shown, be welded to the projection 40, or may be riveted over. In FIGURE 7, the stop means comprises a headed machine screw 60 which passes through a suitable aperture in the projection 38, and is threaded into the projection 40. By turning the screw 60 in or out, the lateral spreading of the discs 30 and 32 may be adjusted to any given degree. Finally, FIGURE 8 shows the use of a C-clamp 70 as the stop means. As shown therein, one of the legs of the C-clamp 70 may be welded to the projection 40.

It is contemplated that, as best shown in FIGURES 2, 3 and 4, the stop means will be employed in pairs. Thus, a pair of bolts 42 are cooperatively associated with the projections 38 and 40.

Although an embodiment constructed in accordance with the present invention has been described with the requisite particularity, the disclosure is of course only exemplary. Consequently, numerous changes in details of construction, in size, configuration and arrangement of components and materials, and in modes of application will be apparent to those familiar with the art and may be resorted to without departing from the scope of the invention as set forth in the following claims.

We claim:

1. In a gate valve having converging valve seats, the improvement comprising: a pair of discs each having a seating surface adapted for fluid-tight mating with one of said valve seats, said discs being spaced and centrally joined to form a flexible wedge-shaped valve closure member having a wider portion and a narrower portion; and stop means entirely positioned on said discs for limiting lateral spreading of said discs at the wider portion of said closure member.

2. A gate valve comprising: a body defining a valving chamber; a pair of convergent valve seats associated with said chamber; a pair of discs spaced and centrally joined to form a flexible wedge-shaped valve closure member; actuating means for moving said closure member into and out of engagement with said valve seats; projecting means associated with said discs for engaging said actuating means; and stop means entirely positioned on said discs cooperatively associated with said projecting means for limiting lateral spreading of said discs.

3. A gate valve in accordance with claim 2, wherein said stop means comprises at least one rivet passing through said projecting means.

4. A gate valve in accordance with claim 2, wherein said stop means comprises at least one C-clamp adapted for engagement with said projecting means.

5. A gate valve in accordance with claim 2, wherein said stop means is laterally adjustable.

6. A gate valve in accordance with claim 5, wherein said stop means comprises at least one bolt passing through said projecting means.

7. A gate valve in accordance with claim 5, wherein said projecting means consists of a projection on each of said discs, and said stop means comprises at least one screw passing through one of said projections and threadably engaging the other of said projections.

8. A gate valve comprising: a body having a valving chamber and a bonnet; a pair of converging valve seats positioned in said body; a pair of discs spaced and centrally joined to form a flexible wedge-shaped valve closure member; actuating means for moving said closure member into and out of engagement with said valve seats; stop means entirely positioned on said discs for limiting lateral spreading of said discs at the wider portion of said closure member and allow the release of any expanding said discs to thereby provide a gap between said seats and closure member and allow the release of any expanding fluid entrapped in said bonnet into the valving chamber when the operating temperature of the valve is abnormally increased in a closed position.

9. A gate valve in accordance with claim 8, wherein said stop means is laterally adjustable.

References Cited

UNITED STATES PATENTS

| | | | |
|---|---|---|---|
| 681,900 | 9/1901 | Whiteman | 251—195 |
| 729,766 | 6/1903 | Jacobsen | 251—195 |
| 786,043 | 3/1905 | Luckett | 251—327 X |
| 2,569,412 | 9/1951 | Fennema et al. | 251—197 |

ARNOLD ROSENTHAL, *Primary Examiner.*